(No Model.)
2 Sheets—Sheet 1.
M. GROSS.
APPARATUS FOR MANUFACTURING GAS.
No. 392,554. Patented Nov. 6, 1888.
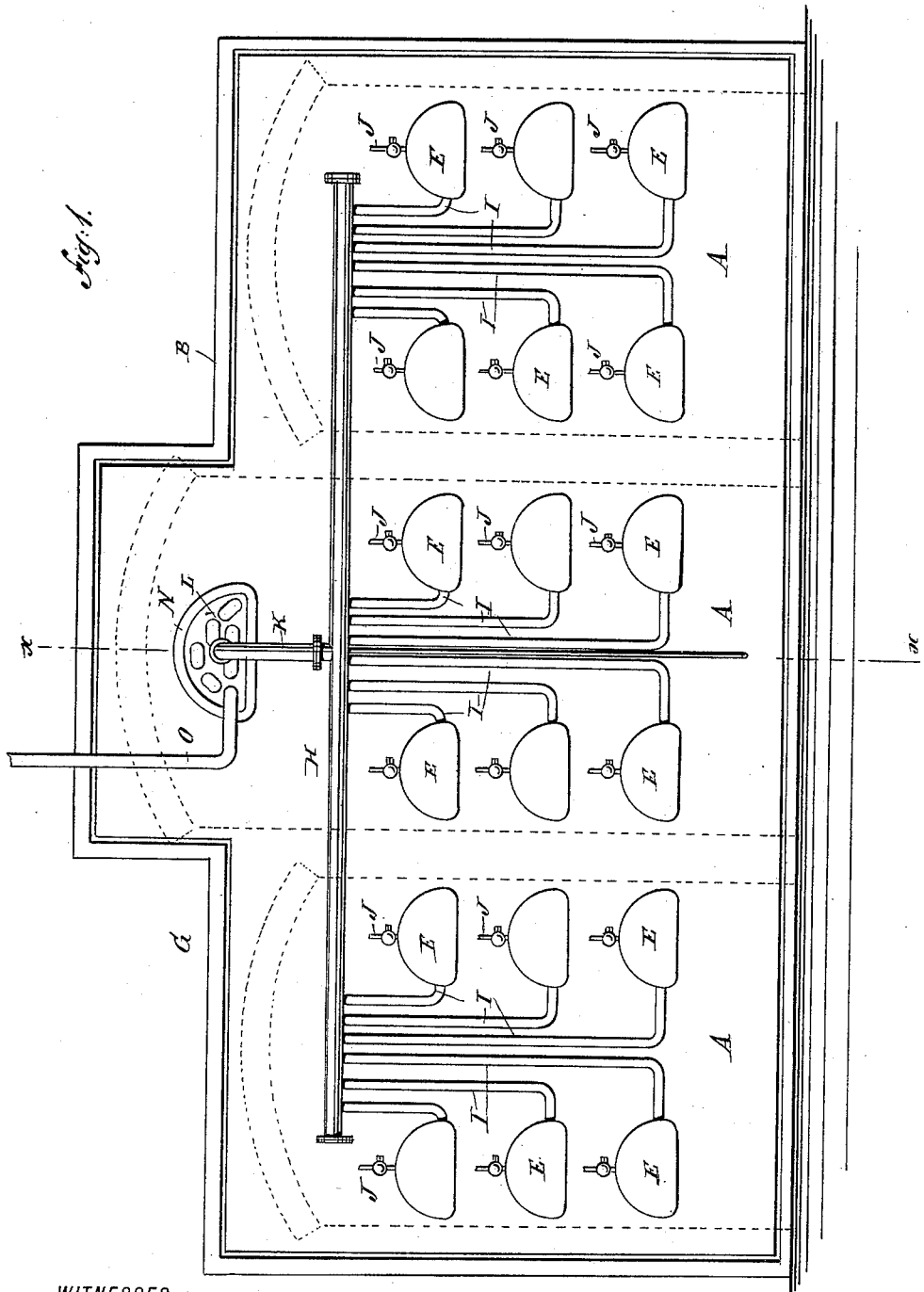
WITNESSES:
INVENTOR,

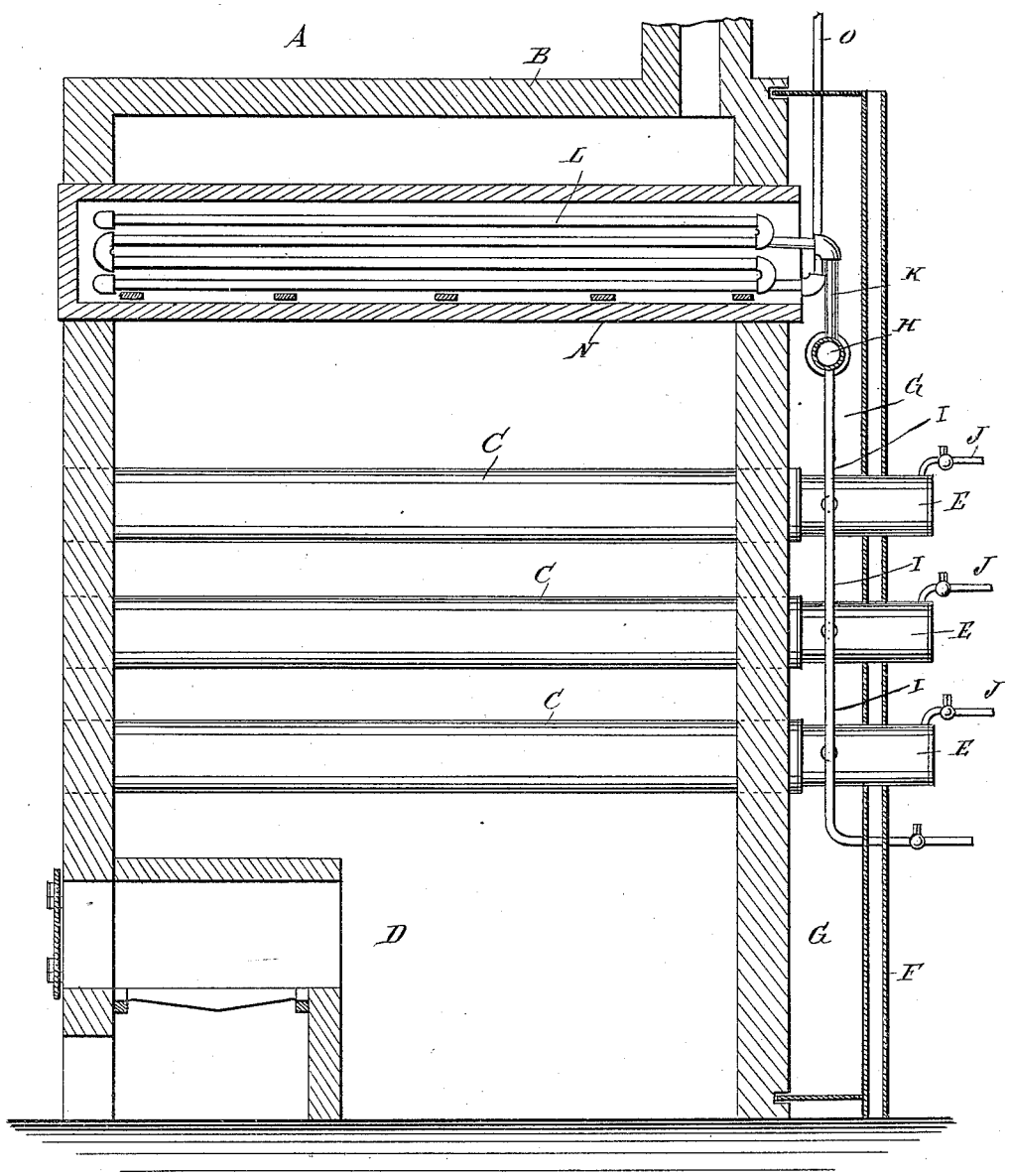

UNITED STATES PATENT OFFICE.

MAGNUS GROSS, OF NEW YORK, N. Y.

APPARATUS FOR MANUFACTURING GAS.

SPECIFICATION forming part of Letters Patent No. 392,554, dated November 6, 1888.

Application filed December 17, 1887. Serial No. 258,244. (No model.)

*To all whom it may concern:*

Be it known that I, MAGNUS GROSS, a citizen of the United States, residing at New York, in the county of New York and State of New York, have invented certain new and useful Improvements in Plants for Distributing Superheated Steam to the Retorts of Benches in Gas-Making; and I do hereby declare that the following is a full, clear, and exact description of the invention, such as will enable others skilled in the art to which it appertains to make and use the same.

My invention relates to the manufacture of illuminating and heating gas.

The object is to provide a compactly-arranged, convenient, and efficient apparatus for the distribution of steam to gas-retorts in a uniform manner and under uniform temperature, predetermined, insuring economy in operation and certainty of result.

With this object in view the invention resides in a plant consisting of a chamber provided with means for heating it to a high degree and containing one or more gas-making retorts, and a second chamber placed at one end of the first at the mouth-pieces of the retorts, and containing a steam-distributing pipe common to all the retorts and branch pipes from the common distributing-pipe to the retorts, in combination with a steam-superheater connected with the common distributing-pipe.

The invention resides, furthermore, in the combination, in a plant for making gas, of a chamber provided with means for heating it to a high degree and containing one or more gas-making retorts and a steam-superheater, and of a second chamber placed against the first and containing a distributing steam-pipe communicating with the superheater in the first chamber and common to all the retorts, and branch pipes from the common distributing-pipe to all the retorts.

The invention resides, furthermore, in the combination, in a plant for the manufacture of steam and oil gas, of a chamber provided with means for heating it to a high degree and containing one or more gas-retorts and a steam-superheater, of a second chamber placed against the first and containing a distributing steam-pipe communicating with the superheater in the first chamber and common to all the retorts, and branch pipes from the common distributing-pipe to the retorts, and of feed-pipes for liquid hydrocarbon entering the retorts.

The particular superheater which it is preferred to employ is not herein claimed, the same forming the subject-matter of another application filed of even date herewith and numbered 258,243.

In the accompanying drawings, in which like letters of reference indicate corresponding parts, Figure 1 is an end elevation of my improvement with the mantle or jacket removed. Fig. 2 is a sectional side elevation of the same on the lines $x\ x$ of Fig. 1.

In my improved plant for making gas from superheated steam and liquid hydrocarbons, I may arrange one or more retorts or several benches, A, alongside each other and surround the same with a casing of masonry, B, forming a chamber. I arrange the retorts preferably in benches, A, each containing, preferably, about six retorts, C, of which three are placed on one side and above each other, and the remaining three in a like manner on the other side, as shown in Fig. 1. Each bench A is provided with the usual furnace, D, furnishing the necessary heat. On the ends of the retorts are held the usual mouth-pieces, E, of any approved construction, and projecting through a mantle, jacket, or hood, F, forming a space or chamber, G, between the end or rear wall of the casing B and the said hood. In this chamber G extends horizontally above the retorts C the distributing-pipe H, from which lead the feed-pipes I to the sides of mouth-pieces E and pass into the same, and within each of these is an injector and mixer of any approved construction, preferably one forming the subject-matter of an application for patent filed of even date herewith and numbered 258,246. The feed-pipes I also extend through the chamber G. Into the outer ends of the mouth-pieces E lead the pipes J, serving to supply the necessary quantity of liquid hydrocarbon, and also discharging into injector and mixer above referred to. As here shown, though other form of superheater may be employed, to the distributing-pipe H leads a pipe, K, from one end of a coil of pipe, L, in a vessel or muffle, N, located in the casing B, preferably above the center bench, the muffle being closed at one end and opening at its other into the chamber G. To the other end of the coil of pipe L leads the steam-supply pipe O, extending, as here illustrated, into the chamber G.

The operation is as follows: The furnaces D heat the distilling-retorts C and the steam-superheating retort N, say, to about 1,800° Fahrenheit, and also heat the chamber G, say, to a temperature of about 1,000° Fahrenheit. The steam from the boiler or other source of supply passes through the inlet O into the coil of pipes L, extending in the highly-heated muffle N, whereby the steam passing through the said coil becomes superheated and passes into the distributing-pipe H by the bench-pipe K. From the distributing-pipe H the superheated steam is passed to the injector and mixer located in the mouth-pieces E by means of the feed-pipes I. Now it will be seen that, the distributing-pipe H and the feed-pipes I and K being located in a highly-heated chamber, the superheated steam passing through these pipes on its way to the retorts will retain the high temperature it received.

Having thus fully described my invention, what I claim as new, and desire to secure by Letters Patent, is—

1. A plant consisting of a chamber provided with means for heating it to a high degree and containing one or more gas-making retorts, and a second chamber placed at one end of the first, at the mouth-pieces of the retorts, and containing a steam-distributing pipe common to all the retorts and branch pipes from the common distributing-pipe to the retorts, in combination with a steam-superheater connected with common distributing-pipe, substantially as described.

2. The combination, in a plant for making gas, of a chamber provided with means for heating it to a high degree and containing one or more gas-making retorts and a steam-superheater, and of a second chamber placed against the first and containing a distributing steam-pipe communicating with the superheater in the first chamber and common to all the retorts and branch pipes from the common distributing-pipe to all the retorts, substantially as set forth.

3. The combination, in a plant for the manufacture of steam and oil gas, of a chamber provided with means for heating it to a high degree and containing one or more gas-retorts and a steam-superheater, of a second chamber placed against the first and containing a distributing steam-pipe communicating with the superheater in the first chamber and common to all the retorts, and branch pipes from the common distributing-pipe to the retorts, and of feed-pipes for liquid hydrocarbon entering the retorts, substantially as set forth and described.

MAGNUS GROSS.

Witnesses:
JNO. W. LINCH,
FRED B. LOX.